United States Patent [19]

Hoffacker et al.

[11] 4,381,891

[45] May 3, 1983

[54] FILM CASSETTE FOR SEVERAL STRIP FILMS

[75] Inventors: Franz Hoffacker, Langenfeld; Guido Kovacic, Unkel; Hermann Lührig, Leverkusen, all of Fed. Rep. of Germany

[73] Assignee: Agfa-Gevaert Aktiengesellschaft, Leverkusen, Fed. Rep. of Germany

[21] Appl. No.: 280,691

[22] Filed: Jul. 6, 1981

[30] Foreign Application Priority Data

Jul. 10, 1980 [DE] Fed. Rep. of Germany ....... 3026070

[51] Int. Cl.³ .............................................. G03B 17/26
[52] U.S. Cl. ................................................. 354/276
[58] Field of Search ................ 354/275, 276, 120, 121

[56] References Cited

U.S. PATENT DOCUMENTS

| | | | |
|---|---|---|---|
| 937,129 | 10/1909 | Whitney | 354/276 |
| 947,946 | 2/1910 | Schmuck | 354/276 |
| 1,330,235 | 2/1920 | Boxell | 354/276 X |
| 1,698,895 | 1/1929 | Stephenson | 354/121 X |
| 2,576,811 | 11/1951 | Schwartz et al. | 354/275 X |

*Primary Examiner*—Donald A. Griffin
*Attorney, Agent, or Firm*—Connolly and Hutz

[57] ABSTRACT

The invention relates to a flat lightproof flexible film cassette for at least two photosensitive strip films suitable for taking several pictures, in which the strip films lie with their longitudinal edges one above the other and are arranged in the film cassette in such a way that after a first film strip has been exposed, the cassette is removed from the camera and, after rotation parallel to one of its axes (L, Q, V) may be re-inserted for exposing the next strip.

7 Claims, 9 Drawing Figures

FILM CASSETTE FOR SEVERAL STRIP FILMS

This invention relates to a film cassette for at least two photosensitive strip films suitable for taking several pictures, consisting of a lightproof, flat flexible case substantially equal in length to a strip of film with intermediate walls for separating the strips of film and at least one cassette opening or film orifice which extends perpendicularly of the length of the case and which is provided with light-sealing means for the passage of the strips of film.

One of the problems of already proposed cassettes and cameras of this type is that a cassette for a strip of film suitable for taking a relatively large number of pictures is very long so that the camera in which it is used becomes unwidely in certain circumstances.

It has already been proposed to use a camera into which a cassette comprising two strips of film arranged laterally offset from one another is loaded, the camera comprising two transport mechanisms, one of which withdraws a strip, exposes the individual pictures and pushes the strip of film back into the cassette and is then switched to the second transport mechanism for the second strip of film in order to withdraw the second strip of film, to push it back in again and at the same time to expose it.

This process is advantageous because twice the number of pictures can be taken using a single cassette controlled by the camera. However, it does require an elaborate camera with two transport mechanisms and a relatively wide cassette. Also, it is not readily possible optionally to use cassettes containing only one strip of film or cassettes containing several strips of film in this camera.

Accordingly, an object of the present invention is to provide a film cassette which is as small as possible in its dimensions for a predetermined strip film format, is capable of accommodating several strips of film and may be used in a camera capable of taking a film cassette containing either only one strip of film or several strips of film.

In a film cassette of the type mentioned at the beginning, this object is achieved in accordance with the invention in that the strip films lie with their longitudinal edges one above the other in the film cassette and are arranged in the film cassette in such a way that, after a first strip film has been exposed, the cassette is removed from the camera and, after rotation parallel to one of its axes, (L,Q,V), may be re-inserted for exposure of the next strip.

By arranging several strip films in one cassette in such a way that their longitudinal edges lie one above the other, it is possible to provide a cassette which is suitable for one or more strip films and which may be kept very narrow in its width.

The cassette accomodates one, two, three or four strip films lying one above the other which, simply by withdrawing the cassette from the camera, turning it parallel to one of its axes and reintroducing it, are successively brought into engagement with the transport mechanism and the individual strip films are successively reduced by the camera from the cassette, exposed and pushed back into the cassette.

One advantageous embodiment of a cassette for two film strips is distinguished by the fact that two film orifices are arranged one above the other in one end face of the cassette and two strip films each with an incision on one side and at least one perforation for transport purposes are provided, their emulsion sides pointing towards different flat sides of the film cassettes, and further by the fact that, to expose the second strip film, the cassette is turned about the axis running parallel to its longitudinal axis after exposure of the first strip film.

Another advantageous embodiment of a cassette is distinguished by the fact the one film orifice is arranged in each end face and two identical strip films are each provided at their beginning with two perforations for transport purposes and by the fact that the emulsion sides of the strip films point towards different flat sides of the film cassette and, to expose the second strip film, the cassette is turned about an axis running parallel to its width after exposure of the first strip film.

The two embodiments differ from one another essentially in the arrangement of the film orifices which necessitates rotation of the cassette parallel to different axes on reintroduction. Where the film orifices lie one above the other, the beginning of the strip film receives an incision so that each strip of film may be individually taken up by film transport means on the camera side whereas, where the cassette orifices are arranged on different end faces of the cassette, there is no need for the beginning of the film to be cut for the strip films to be individually gripped. Perforations may be provided along both edges of the strip films for transport purposes. The emulsion sides of the strip films in the cassette may face either towards one side or to different sides of the cassette, depending upon the direction in which the cassette has to be turned after exposure of the first strip film.

In both embodiments, it is possible, for example, to allow the strip films to slide on one another on their sides facing the emulsion side (namely the back of the films), thereby eliminating the need for a partition between the strips of film.

In one particular expedient embodiment, two film orifices are arranged one above the other in each end face of the film cassette and four identical strip films each comprising an incision on one side and at least one perforation for transport purposes at the beginning of the strips, the strip films being arranged in such a way that, at the end faces, their emulsion sides face in pairs towards different flat sides of the cassette and, to exposure the other strips of film, the cassette is rotated after exposure of the first strip of film about an axis running parallel to its longitudinal axis and about an axis running perpendicularly of the width and length of the cassette.

This embodiment enables four times the number of pictures to be taken using one cassette. A camera designed for cassettes containing one or two strip films may be used for taking the pictures. A cassette accommodating only three strip films would also be possible in this embodiment. Multiple cassettes according to the embodiment described above are less expensive to produce on account of the smaller amount of material required for their production, especially since in the majority of cases there is no need for partitions between the backs of the films.

Another embodiment of the cassette is distinguished by the fact that, to avoid double exposures, the cassette and/or the strip films carry marks identifying the strip film sequence and/or numbers for correct loading into a camera and the camera is provided with a corresponding mark at the loading slot and after removal of the cassette from the camera, the mark and/or numbers can be removed from the cassette or the strip films.

An additionally increased safety against double exposure is obtained by filling the cassette with strip films which, in the vicinity of the first transport perforation, have only one narrow transport tag which is folded down or cut off by the camera during or after exposure and reinsertion of the strip film into the cassette, so that this strip film cannot be transported again.

The invention is described in more detail in the following with reference to the accompanying drawings, in which.

Figure 1:
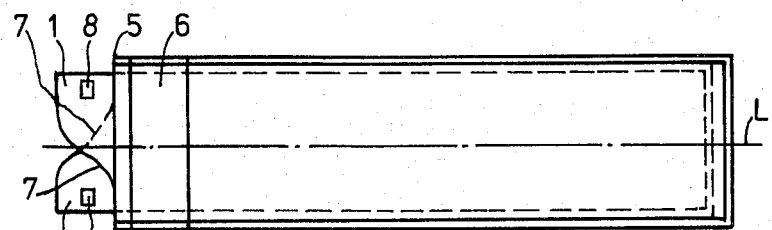
FIG. 1 is a plan view of a cassette comprising two strip films and two films orifices in one end face of the cassette.
Figure 2:
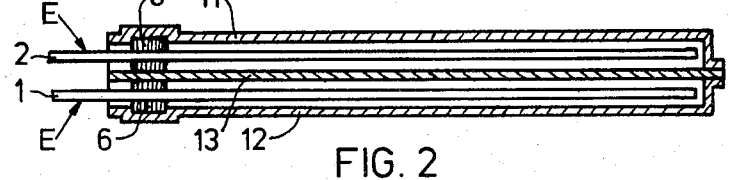
FIG. 2 is a longitudinal section through the cassette shown in FIG. 1.

As shown in FIGS. 1 and 2, a flat, case-like film cassette for two photosensitive strip films 1, 2 suitable for taking several pictures consists of two flat, shell-like walls 11 and 12. They are made of a substantially rigid, only slightly flexible lightproof foil, for example, of metal or plastic material, which is capable of being formed, for example by deep drawing or moulding or thermoforming, and are joined to one another in lightproof manner along two longitudinal sides and one end side 5. The film orifices 6 for the passage of the strip films 1, 2 which are sealed off by light sealing means are situated in the open end side or face 5. The two walls 11, 12 may be symmetrical to one another or even different from one another in shape. In the embodiment shown in FIGS. 1 and 2, they are symmetrical to one another in shape. They are provided with a flat edge on the sides to be joined. A shallow trough substantially equal in length and width to the strip films 1, 2 is formed in this edge by deep drawing or pressing, the two troughs forming the space required for the strip films 1, 2 when the walls 11, 12 are joined together.

A separating foil acting as a partition 13 for the two strip films 1, 2 is welded or bonded in at the connecting lines between the walls 11, 12. In the vicinity of the cassette orifices 6, this partition 13 is provided on both sides with light-proofing means so that each strip film 1, 2 is protected against the entry of light on both sides in the cassette.

In the case of scratch proof strip films, however, it is also possible to dispense with the partition 13 and to introduce the two strip films 1, 2 into the cassette in such a way that those sides of the strip films 1, 2 which are situated opposite he emulsion sides E lie and slide on one another. In order in this case to prevent the entry of light between the film strips 1, 2 a sealing strip is stretched across the longitudinal edge of the film in the vicinity of the cassette orifices 6. It is also possible to colour the back of the strip films black and thus to improve safety against the access of light to the strip films.

To expose the strip films, the film cassette is loaded into a camera and the transport mechanism of the camera engages in the first perforation 8 in the first strip film 1 and advances the strip film in the arrowed direction beyond the cassette for each exposure and, after the last exposure, pushes the strip of film back into the lightproof cassette in the arrowed direction. The camera may of course also be disigned in such a way that the strip film 1 is first completely withdrawn and exposed during its step-by-step return.

After exposure of the strip film 1, the cassette is removed, turned through 180° about its longitudinal axis L and pushed back into the camera for exposing the second strip film 2.

Figure 3:
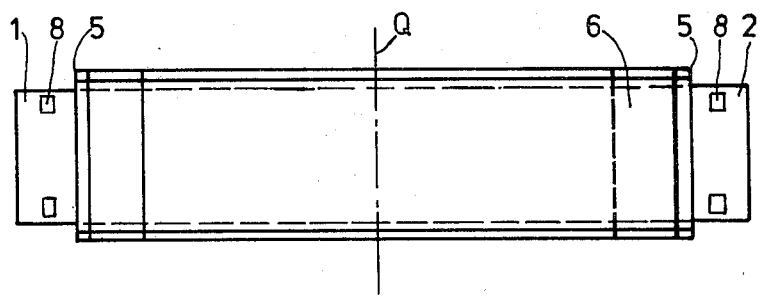
FIG. 3 is a plan view of a cassette comprising a film orifice in each end face of the cassette.
Figure 4:
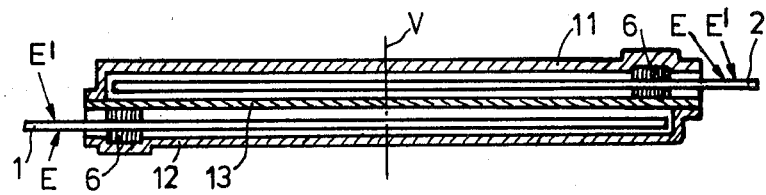
FIG. 4 is a longitudinal section through the cassette shown in FIG. 3.

FIGS. 3 and 4 are respectively a plan view of and a section through an embodiment of a film cassette in which one film orifice 6 is arranged in each end face 5 for the passage of the strip films 1, 2. The film cassette is also formed from two wall shells 11 and 12 in which the strip films 1 and two are displaceable. In this arrangement of the strip films and film orifices in the cassette, one or even two rows of perforations 8 may be provided for transporting the strip films in the camera. The emulsion sides E of the strip films 1, 2 may be directed to one or different sides of the cassette. In FIG. 3 for example, both strips films are introduced with the photographically active coating, the emulsion side E' (FIG. 4), facing towards one flat side of the cassette. If it is desired to prevent the sensitive emulsion side E' from sliding along the back of the other strip film, it is best to bond or weld a partition 13 between the walls 11 and 12. For exposing the second strip film 2 where the strips are arranged in this way, the cassette has to be rotated parallel in the vertical axis V after exposure and removal from the camera in order to expose the second strip of the cassette. If the strip films are introduced into the cassette in such a way that the sides coated with emulsion E face towards different flat sides of the cassette, the cassette has to be rotated parallel to the transverse axis Q of the cassette for exposing the strip film 2 before it is introduced into the camera for exposing the second strip film.

Since, in this embodiment (FIG. 4), the strip films may be introduced in such a way that their emulsion-free backs are in contact with one another, it is possible in this case, too, to dispsense with a partition 13 (not shown).

Figure 5:
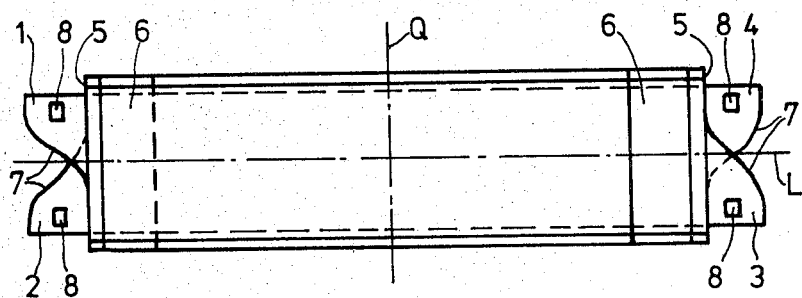
FIG. 5 is a plan view of a cassette containing four strip films.
Figure 6:
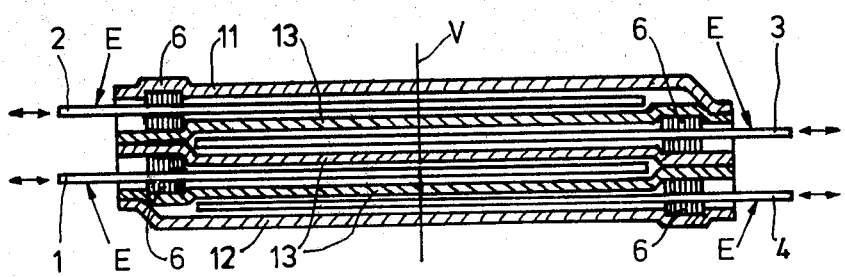
FIG. 6 is a longitudinal section through the cassette shown in FIG. 5 with partitions between the film strips.
Figure 7:
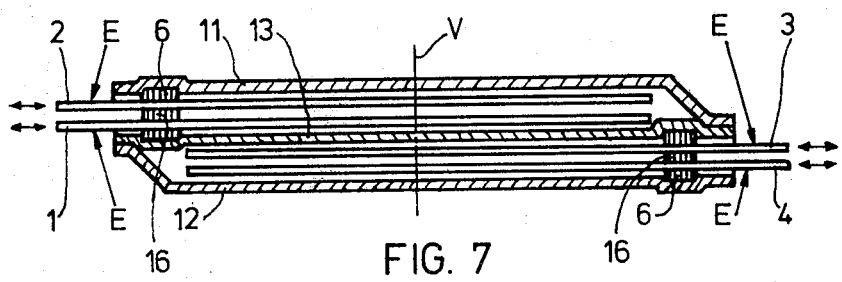
FIG. 7 is a longitudinal section through the cassette shown in FIG. with only one partition.

One particularly expendient embodiment is a cassette for accommodating four strip films 1,2,3,4 of the type shown in FIGS. 5,6 and 7. FIG. 5 is a plan view of the film cassette which is similar in structure to a cassette of the type shown in FIG. 1 when two of these two-film cassettes are placed on one another, rotated through 180°, but with the difference that there is less need for a partition 13 for producing the cassette shown in FIG. 5. The cassette shown in FIG. 6 consists of an upper wall 11, three partitions 13 and a lower wall 12. For each of the four strip films 1,2,3, and 4, there is a cassette orifice 6 arranged in each case between the walls 11, 12 and the partitions 13.

The strip films 1,2,3 and 4 are provided with an incision 7 which enables the film transport mechanism of an associated camera to engage only one film strip at a time through the transport perforation 8. For further transport, all the strip films have at least one row of perforations, at least one perforation being provided per frame.

Depending on the position of the emulsion side E of the strip films 1,2,3,4 in the cassette, there are sequences in which the cassettes may be turned about their axes after exposure of the strip films. The cassette shown in FIG. 6 contains, for example, film strips of which the emulsion sides E on the strip film are all situated facing outwards away from the centre of the cassette. If the strip films are successively exposed in the sequence 1 to 4, the cassette is rotated parallel to the following axes between the exposure of the individual strip films: about the L-axis after exposure of the strip film 1, about the V-axis after the strip film 2 and again about the L-axis after the strip film 3.

The individual strip films may of course be exposed in any sequence. This is of interest insofar as it is possible to load the cassette with different types of film. One cassette may contain, for example, black-and-white films and colour films or even negative or reversal films, so that black-and-white pictures or colour pictures and colour transparancies of a subject may be taken in rapid succession using one and the same camera.

FIG. 7 shows a cassette of simpler structure. It consists of an upper wall 11, only one partition 13 and a lower wall 12. Film orifices 6 are arranged in both end faces 5 of the cassette, being shaped in such a way that both sides of the strip films 1, 2 and 3, 4 are protected against the entry of light. To this end, a sealing strip 16 is inserted between the strip films and is welded or bonded to the lateral longitudinal seams along the sides of the cassette. The strip films are introduced into the cassette in such a way that their emulsion-free sides are in contact with and slide in one another. In all four strip films, the emulsion sides E face outwards in pairs.

In order to avoid double exposures of a strip film, a mark has to be provided either on the films or on the cassette to show the user or to enable him or her to ascertain whether or not a strip of film has already been exposed.

Figure 8:
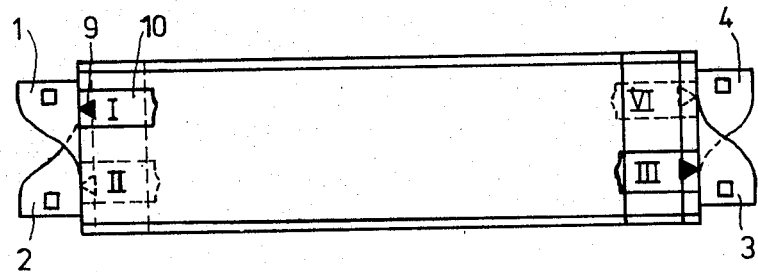
FIG. 8 is a plan view of a cassette with guidance marks and numbers.

FIG. 8 shows a simple device for preventing double exposures. A label with a mark 9 and a letter or FIG. 10 is associated with each strip film of a two-film or four-film cassette. The camera also has a corresponding mark (not shown) at the cassette loading point, namely on that side at which the strip of film is engaged and transported. The cassette is loaded or inserted into the camera in such a way that the marks 9 are situated adjacent one another. After exposure of the strip of film and after removal of the cassette, the label with the mark 9 and the film strip index 10 is removed by separation from the cassette. It can then be seen from the cassette that the unlabelled strip film has already been exposed. This method is simple and inexpensive, but is attended by the disadvantage that the user of the cassette is responsible for removing the label.

Figure 9:
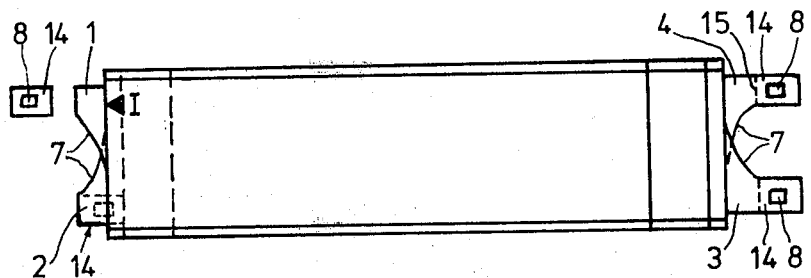
FIG. 9 shows a cassette containing special strip films in which the transport tag is designed to be cut off or folded over.

Accordingly, FIG. 9 shows a device for avoiding double exposures which is considerably safer. The strip films 1,2,3 and 4 in the cassette have been punched through towards their front (at 7), leaving over only narrow transport tags 14 with transport perforations 8. The transport tags 14 may be provided with a perforation 15 at which the transport tag 14 with the transport perforation 8 may be cut off or folded over.

Once the strip film 1 has been exposed and the cassette removed from the camera for turning round, the transport tag 14 with the transport perforation 8 is cut off so that, if the cassette is incorrectly reloaded into the camera by mistake, the strip of film can no longer be engaged. It is also possible for the transport tag 14 to be bent over, as shown in the case of the strip film 2. The transport tag 14 with the transport perforation 8 can be manually torn off by the user. Alternatively, the camera may be provided with a cutting edge which, after exposure and re-insertion of the strip film into the cassette, cuts off the transport tag 14 following activation by a special mechanism controlled by the camera or by opening the closure of the cassette slot in the camera for removing the cassette by hand (not shown).

The invention also includes other embodiments in which at least two strip films are arranged with their longitudinal edges lying one above the other in a flat cassette. Thus, a cassette may also be made to accommodate three strip films (not shown). The strip films may be mounted in the cassette with spacer strips in such a way that they are capable of moving freely and of being removed and re-introduced with minimal effort at the camera end.

We claim:

1. A film cassette adapted to receive at least two photosensitive strip films each providing for a multiplicity of exposures and having perforation for film transport means on the camera side, said cassette consisting of a lightproof flat, flexible case of substantially the same length as said strip film, at least one cassette orifice arranged at an end face of the cassette and defined by said case and normal to the length of said case, with light sealing means in said orifice adapted to permit said strip film to pass from the lightproof case through the orifice to the exposure place in the camera and back into the case and to receive said strip films so that they are arranged in said cassette with their longitudinal edges one above the other, said cassette being adapted to bring the perforation of the strip film successively into engagement with the transport mechanism of the camera to provide removal of a first strip film out of the cassette step by step for successive image exposure exterior to the cassette to receive the first strip reintroduced into the cassette after the last exposure and said case being so constructed and the strip film so arranged in the cassette that after the exposure of a first strip film the cassette is removable from the camera and rotatable parallel to one of its axis and the cassette is adapted to provide for the removal of a next strip film from the cassette by engagement with the mechanism of the camera for advancement of the film for exterior exposure and subsequent reintroduction of the next strip film into the cassette.

2. A film cassette as claimed in claim 1, characterized in that one film orifice is provided in each end face of the film cassette and two identical film strips each having an emulsion, comprising at least one transport perforation at the beginning of the strip are provided and in that the emulsion sides face towards the same flat side of the film cassette and to expose the second strip film, the film cassette is rotatable after exposure of the first strip film about an axis running perpendicularly of the width and length of the film cassette.

3. A film cassette as claimed in claim 1, characterized in that two film orifices are arranged one above the other in one end face of the cassette and two film strips each with a cut-away portion at one end side and a perforation at the other side for transport purposes are provided and positioned in said cassette with their emulsion sides facing different flat sides of the cassette, adapted to provide engagement of the perforation of the film for the advancement of the respective film out and into the cassette and in that to expose the second strip film the cassette is turned about the axis running parallel to its longitudinal axis after exposure of the first strip film.

4. A film cassette as claimed in claim 1, characterized in that a film orifice is arranged in each end of the cassette face and two identical strip films are positioned in the cassette one above the other, each provided with at least one perforation for transport purposes and the emulsion sides of the strip films face towards the same, flat side of the film cassette and the cassette being adapted to turn about its transverse axis after exposure of the first strip film to expose the next one.

5. A film cassette adapted to receive at least two photosensitive strip films each providing for a multiplicity of exposures and having perforation for film transport means on the camera side, said cassette consisting of a light proof flat, flexible case of substantially the same length as said strip film, two film orifices arranged at each end face of the cassette, said orifices being defined by said case and normal to the length of the case and the two orifices at each end arranged one above the other in the end face of the film cassette in combination with four identical strip films, with a cut-away portion at one end side and a perforation at the other side for transport purposes, and positioned in said cassette with their emulsion side faces in pairs toward different flat sides of the cassette with light sealing means in said orifices adapted to permit said strip films to pass from the lightproof case through the orifices to the exposure place in the camera and back into the case and to receive said strip films so that they are arranged in said cassette with their longitudinal edges one above the other, said cassette being adapted to bring the perforation of the strip films successively into engagement with the transport mechanism of the camera to provide removal of each strip film out of the cassette step by step for successive image exposure exterior to the cassette to receive said strip reintroduced into the cassette after the last exposure and said case being so constructed and the strip film so arranged in the cassette that after the exposure of said strip film the cassette is removable from the camera and rotatable parallel to one of its axis and the cassette is adapted to provide for the removal of the next strip film from the cassette by engagement with the mechanism of the camera for advancement of the film for exterior exposure and subsequent reintroduction of the next strip film into the cassette.

6. A film cassette as claimed in claims 1 or 5, characterised in that the cassette and/or the strip films carry marks identifying the strip film sequence and direction and/or numbers for correct loading into a camera and the camera is provided with a corresponding mark at the loading slot and after removal of the cassette from the camera, the mark and/or numbers can be removed from the cassette or the strip films.

7. A film cassette as claimed in claims 1 or 5, characterised in that the cassette is filled with strip films which, in the vicinity of the first transport perforation, have only one narrow transport tag which is folded down or cut off by the camera during or after exposure and re-insertion of the strip film into the cassette so that a film cannot be transported again.

* * * * *